:::

United States Patent Office 3,337,654
Patented Aug. 22, 1967

3,337,654
OXYALKYLENATED HYDROXYHYDROCARBON
THIOPHOSPHATES
Henryk A. Cyba, Evanston, Ill., assignor to Universal Oil
Products Company, Des Plaines, Ill., a corporation of
Delaware
No Drawing. Filed Dec. 12, 1963, Ser. No. 330,002
10 Claims. (Cl. 260—950)

This invention relates to oxyalkylenated hydroxyhydrocarbon thiophosphates as new compositions of matter and to their use as additives to organic substrates.

The preferred oxyalkylenated hydroxyhydrocarbon dithiophosphate of the present invention is believed to be of the following formula:

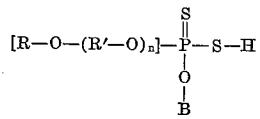

where O is oxygen, P is phosphorus, S is sulfur, H is hydrogen, $n$ is an integer of from one to forty, R is a hydrocarbon group, R' is alkylene and B is selected from the group consisting of hydrogen and the same as the bracketed group.

In a preferred embodiment R is selected from alkylphenyl and aliphatic groups. In the alkylphenyl species, one, two or three alkyl groups of from four to thirty and, more particularly, from six to fifteen carbon atoms each, will be attached to the phenyl ring. Illustrative preferred alkylphenyl groups include hexylphenyl, heptylphenyl, octylphenyl, nonylphenyl, decylphenyl, undecylphenyl, dodecylphenyl, tridecylphenyl, tetradecylphenyl, pentadecylphenyl, etc., dihexylphenyl, diheptylphenyl, dioctylphenyl, dinonylphenyl, didecylphenyl, diundecylphenyl, didodecylphenyl, etc., trihexylphenyl, triheptylphenyl, trioctylphenyl, trinonylphenyl, tridecylphenyl, etc. It is understood that the alkyl groups attached to the phenyl group may be of primary, secondary or tertiary configuration, the primary and secondary configurations generally being preferred. In another embodiment the alkylphenyl radical may contain one or more alkyl groups containing four to thirty carbon atoms and one or more alkyl groups containing less than four carbon atoms and selected from methyl, ethyl and propyl. When one alkyl group is attached to the phenyl ring, it preferably is in the position para to the oxygen. When two alkyl groups are attached to the phenyl ring, they preferably are in the 2,4- or 3,5-positions.

Where R is an aliphatic group, it preferably contains from six to forty carbon atoms and, more particularly, from ten to thirty carbon atoms. Illustrative preferred aliphatic groups include decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, etc. In general, it is preferred that the aliphatic group is saturated. In another embodiment, the aliphatic group may be unsaturated and will be selected from olefinic radicals corresponding to the saturated radicals hereinbefore specifically set forth. The aliphatic group may be straight chain or may contain branching in the chain.

R' in the above general formula is an alkylene group and may contain from one to ten and preferably from two to four carbon atoms per group. The preferred alkylene radicals thus are ethylene, propylene and butylene. As hereinbefore set forth, $n$ is an integer of from one to forty and preferably of from two to fifteen.

The compound of the present invention is prepared in any suitable manner. In a preferred method, the hydroxyhydrocarbon, including particularly alkylphenol or aliphatic alcohol, is oxyalkylenated by reacting with alkylene oxide, including particularly ethylene oxide, in the molar ratios to produce an oxyalkylenated hydroxyhydrocarbon containing the oxyalkylene group in the desired proportion. As hereinbefore set forth, in a preferred embodiment the compound contains from two to fifteen oxyalkylene groups. The oxyalkylenation is effected in any suitable manner and generally will be conducted at a temperature of from about room temperature to about 175° C. and more particularly from about 95° C. to about 150° C. When polyoxyalkylenation is desired, the reaction is effected in the presence of a catalyst such as sodium hydroxide, potassium hydroxide, tertiary amine, quarternary hydroxide, etc. When the oxyalkylenation is to be limited to the addition of one oxy group, the catalyst is used with the alkanols but may be omitted with the alkylphenols. Superatmospheric pressure may be employed, which may range from 10 to 1000 pounds or more.

The oxyalkylenated hydroxyhydrocarbon then is reacted in any suitable manner with phosphorus pentasulfide or other suitable phosphorus sulfide to form the desired thiophosphate. At the present time there are different schools of thought as to the structure of phosphorus pentasulfide. It is believed to be $P_2S_5$, but also has been expressed as $P_4S_{10}$. Various structures have been proposed including a polymeric cage-like configuration. Regardless of the exact structure of this compound, phosphorus pentasulfide is available commercially and is used for reaction with the oxyalkylenated hydroxyhydrocarbon in the manner herein set forth. In the interest of simplicity, phosphorus pentasulfide is also referred to in the present specifications as $P_2S_5$, with the understanding that this is intended to cover the phosphorus pentasulfide available commercially or prepared in any suitable manner.

In a preferred embodiment the compound of the present invention is a di-(oxyalkylenated hydroxyhydrocarbon)-dithiophosphate (B in the above formula corresponding to the bracketed group) and is prepared by the reaction of four mole proportions of the oxyalkylenated hydroxyhydrocarbon with one mole proportion of $P_2S_5$. Generally, an excess of $P_2S_5$ is used in order to insure complete reaction, which excess usually will not be above about 25% by weight of the stoichiometric amount of $P_2S_5$. The reaction conveniently is effected by heating the oxyalkylenated hydroxyhydrocarbon and, with intimate stirring, adding the $P_2S_5$ thereto, preferably in incremental portions. The reaction is effected by refluxing the mixture of reactants to effect formation of the di-(oxyalkylenated hydroxyhydrocarbon)-dithiophosphate with the liberation of one mole proportion of hydrogen sulfide.

The reaction preferably is effected in the presence of a solvent and the temperature of refluxing accordingly will depend upon the specific solvent used. Any suitable solvent may be employed. Preferred solvents comprise aromatic hydrocarbons and include particularly benzene.

When using benzene as the solvent, the refluxing temperature will be in the order of 80° C. Other aromatic solvents include toluene, xylene, ethyl benzene, cumene, etc., or mixtures thereof. In another embodiment the solvent may comprise a paraffinic hydrocarbon or mixtures thereof which preferably are selected from hexane, heptane, octane, nonane, decane, undecane, dodecane, etc. As hereinbefore set forth, the refluxing temperature will depend upon the particular solvent employed and thus may range from about 60° and preferably should not exceed about 100° C. The reaction may be effected at atmospheric pressure or, when desired, at subatmospheric pressure or superatmospheric pressure.

Hydrogen sulfide is formed in the above reaction and preferably is continuously removed from the reaction zone. After completion of the reaction, the reaction mass may be filtered to remove unreacted $P_2S_5$, if any. When used as an additive to organic substrates, the solution of the di - (oxyalkylenated hydroxyhydrocarbon) - dithiophosphate in benzene or other solvent may be utilized as such. However, when desired, the benzene solvent may be removed by distillation, preferably under vacuum. The di - (oxyalkylenated hydroxyhydrocarbon) - dithophosphate is recovered as a liquid of medium viscosity.

While the di-(oxyalkylenated hydroxyhydrocarbon) dithiophosphate is preferred, it is understood that the mono - (oxyalkylenated hydroxyhydrocarbon) - dithiophosphate also is comprised within the scope of the present invention, as well as the mono- and/or di-(oxyalkylenated hydroxyhydrocarbon) - monothiophosphate. The latter compound may be prepared, for example, by reacting di - (oxyalkylenated hydroxyhydrocarbon)-phosphite or the sodium salt thereof with free sulfur.

Another embodiment of the invention comprises the metallic salt of the oxyalkylenated hydroxyhydrocarbon thiophosphate. Any suitable metallic salt is contemplated including, for example, the salt of sodium, potassium, magnesium, lithium, calcium, strontium, barium, chromium, molybdenum, tungsten, manganese, cobalt, nickel, platinum, palladium, etc. In one embodiment these salts are prepared by reacting the di-(oxyalkylenated hydroxyhydrocarbon)- dithiophosphate with the metal oxide or hydroxide. This is effected by slowly heating the dithiophosphate with intimate stirring and gradually adding the metal oxide or hydroxide thereto. The temperature of heating may range from 80° to 200° C. or higher and, more particularly, within the range of from about 120° to about 150° C. In another method, the metallic salts are obtained by reacting the thiophosphate with a metal halide and particularly metal chloride, metal sulfate, metal acetate, metal propionate, etc., be metathetic reaction.

Illustrative preferred compounds of the present invention include di - (oxyethylenated octylphenol)- dithiophosphate containing from two to fifteen oxyethylene groups, di - (oxyethylenated dioctylphenol)-dithiophosphate containing from two to fifteen oxyethylene groups, di-(oxyethylenated nonylphenol) - dithiophosphate containing from two to fifteen oxyethylene groups, di-(oxyethylenated dinonylphenol) - dithiophosphate containing from two to fifteen oxyethylene groups, di-(oxyethylenated decylphenol)-dithiophosphate containing from two to fifteen oxyethylene groups, di-(oxyethylenated didecylphenol)-dithiophosphate containing from two to fifteen oxyethylene groups, di - (oxyethylenated undecylphenol) dithiophosphate containing from two to fifteen oxyethylene groups, di - (oxyethylenated diundecylphenol)-dithiophosphate containing from two to fifteen oxyethylene groups, di - (oxyethylenated dodecylphenol) - dithiophosphate containing from two to fifteen oxyethylene groups, di - (oxyethylenated didodecylphenol) - dithiophosphate containing from two to fifteen oxyethylene groups, etc., corresponding di - (oxypropylenated alkylphenol)-dithiophosphates, etc. When used in lubricating oil, preferred metallic salts include the zinc, calcium, cadmium, molybdenum, nickel and lead salts, and particularly these salts of the specific di - (oxyalkylenated alkylphenol)-dithiophosphates set forth above.

Preferred di-(oxyalkylenated aliphatic alcohol)-dithiophosphates include di-(oxyethylenated decanol)-dithiophosphate,
di-(oxyethylenated undecanol)-dithiophosphate,
di-(oxyethylenated dodecanol)-dithiophosphate,
di-(oxyethylenated tridecanol)-dithiophosphate,
di-(oxyethylenated tetradecanol)-dithiophosphate,
di-(oxyethylenated pentadecanol)-dithiophosphate,
di-(oxyethylenated hexadecanol)-dithiophosphate,
di-(oxyethylenated heptadecanol)-dithiophosphate,
di-(oxyethylenated octadecanol)-dithiophosphate,
di-(oxyethylenated nonadecanol)-dithiophosphate,
di-(oxyethylenated eicosanol)-dithiophosphate,
di-(oxyethylenated heneicosanol)-dithiophosphate,
di-(oxyethylenated docosanol)-dithiophosphate,
di-(oxyethylenated tricosanol)-dithiophosphate,
di-(oxyethylenated tetracosanol)-dithiophosphate,
di-(oxyethylenated pentacosanol)-dithiophosphate,
di-(oxyethylenated hexacosanol)-dithiophosphate,
di-(oxyethylenated heptacosanol)-dithiophosphate,
di-(oxyethylenated octacosanol)-dithiophosphate,
di-(oxyethylenated nonacosanol)-dithiophosphate,
di-(oxyethylenated triacontanol)-dithiophosphate, etc., corresponding di-(oxypropylenated alkanol)-dithiophosphates, etc. Here again, when used in lubricating oil, preferred metallic salts include the zinc, calcium, cadmium, molybdenum, nickel and lead salts, and particularly these salts of the specific di-(oxyalkylenated alkanol) dithiophosphates set forth above.

Conveniently the final product is recovered as a solution in a suitable solvent and is used in this manner as an additive to an organic substrate. However, when the product is recovered in the absence of a solvent or when the product is not sufficiently soluble in the substrate, the desired solubility may be obtained by dissolving the compound in a mutual solvent. Suitable solvents for this purpose comprise phenols and particularly alkylphenols or polyalkylphenols in which the alkyl group or groups contain from six to twenty carbon atoms. The phenol may be used in a concentration of from about 5% and preferably from about 25% to about 500% by weight, and more particularly from about 30% to about 200% by weight of the product of the present invention.

The oxyalkylenated hydroxyhydrocarbon thiophosphate will have varied utility and is useful as an additive to organic substrates which undergo oxidative deterioration. In addition, the additive serves as a detergent-dispersant, peroxide decomposer, etc. Organic substrates include gasoline, naphtha, kerosene, jet fuel, lubricating oil, diesel fuel, fuel oil, residual oil, drying oil, grease, wax, resin, plastic, rubber, etc.

The oxyalkylenated hydroxyhydrocarbon thiophosphate is advantageously used as an additive in lubricating oil, particularly when the lubricating oil is not subjected to extreme temperature conditions. The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other natural oils include those of animal, marine or vegetable origin.

The lubricating oils generally have a viscosity within the range of from 10 SUS at 100° F. to 1000 SUS at 210° F. (SAE viscosity numbers include the range from SAE 10 to SAE 160.) The petroleum oils are obtained from paraffinic, naphthenic, asphaltic or mixed base crudes. When highly paraffinic lubricating oils are used, a solubilizing agent also is used.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di - 3,5,5 - trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentane diol - di(2 - ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from three to twelve carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkanes such as trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., as well as the esters thereof and particularly triesters in which the ester portions each contain from three to twelve carbon atoms and may be selected from those hereinbefore specifically set forth in connection with the discussion of the neopentyl glycol esters, and (3) tricresylphosphate, trioctylphosphate, trinonylphosphate, tridecylphosphate, as well as mixed aryl and alkyl phosphates, etc.

The present invention also is used in the stabilization of greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semi-solid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadecyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils. The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

The concentration of the oxyalkylenated hydroxyhydrocarbon thiophosphate to be employed as an additive will depend upon the particular substrate in which it is to be used. In general, the additive is used in a concentration of from about 0.001% to about 25% by weight of the substrate and preferably within the range of from about 0.01% to about 5% by weight of the substrate. When used in conventional lubricating oil, the additive generally may be employed in a concentration of from about 0.01% to about 2% by weight of the oil. When used in lubricating oil for more severe operations, such as hypoid gear oil, the additive is used in a concentration of from about 1% to about 20% or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5% to 5% by weight of the oil. When used in cutting oil, rolling oil, soluble oil, drawing compound, etc., the additive may be used in a concentration of from about 0.1% to about 10% by weight of the oil. When used in slushing oil, the additive may be used in a concentration of from about 0.1% to about 15% by weight of the oil.

It is understood that the additive of the present invention may be used along with other additives incorporated in the organic substrate. The other additives will depend upon the particular organic substrate. For example, in lubricating oil, the additional additives may comprise one or more of viscosity index improver, pour point depressor, anti-foam additive, detergent, corrosion inhibitor, additional antioxidant, etc. Preferred additional antioxidants are of the phenolic type and include tertiarybutylcatechol, 2,6-ditertiarybutyl-4-methylphenol, 2,4 - dimethyl-6-tertiarybutylphenol, etc., 2-tertiarybutyl-4-methoxyphenol, 2-tertiarybutyl-4-ethoxyphenol, etc.

The oxyethylenated hydroxyhydrocarbon thiophosphate of the present invention is an emulsifying agent and therefore will serve to emulsify water and oil of lubricating viscosity for use as lubricating oil, slushing oil, cutting oil, rolling oil, soluble oil, drawing compound, etc. When desired, an additional emulsifying agent may be employed. Any suitable emulsifying agent can be used, including alkali metal sulfonates of petroleum sulfonic acids, mahogany sulfonates, naphthenic acids, fatty acids, etc., fatty alcohol sulfonates, pentaerythritol oleates, laurates, etc. The amount of water used in the emulsified oils will depend upon the particular use of the emulsion and may range from 0.25% to 50% or even up to 98% by weight of the composition.

In some cases the oxyethylenated hydroxyhydrocarbon thiophosphate is not readily soluble in the substrate. In such instances solubility may be effected by utilizing a suitable solvent. Particularly preferred solvents include alkylphenols and especially those containing from about six to about twelve carbon atoms in the alkyl group.

The following examples are introduced to illustrate further the novelty and utility of the present invention but not with the intention of unduly limiting the same.

EXAMPLE I

The compound of this example is di-(oxyethylenated octylphenol)-dithiophosphate containing three oxyethylene groups per each octylphenyl group. This compound was prepared by charging 202.8 g. (0.6 mole) of oxyethylenated octylphenol containing three oxyethylene groups and 200 g. of benzene into a one liter 3-neck flask and then stirring and heating the mixture to 80° C. At this temperature and with stirring, 34.96 g. (0.15 mole + 5% excess) of $P_2S_5$ were added gradually over a period of 0.5 hour. Vigorous stirring and heating at 80° C. was continued for an additional one hour. Hydrogen sulfide was liberated during the reaction. Following completion of the reaction, the reaction mixture was filtered to remove any unreacted $P_2S_5$ and the solution then was distilled under vacuum at a maximum temperature of 100° C. to remove the benzene solvent. The di-(oxyethylenated octylphenol)-dithiophosphate was recovered as a clear liquid of medium viscosity and had a refractive index $n^D_{20}$ of 1.5284.

EXAMPLE II

Di-(oxyethylenated octylphenol)-dithiophosphate containing five oxyethylene groups was prepared in substantially the same manner described in Example I. In this preparation, 213 g. (0.5 mole) of oxyethylenated octylphenol containing five oxyethylene groups per each octylphenyl group and 200 g. of benzene were charged into a reaction flask, stirred and heated to 80° C., and then 29.14 g. (0.125 mole + 5% excess) of $P_2S_5$ were added gradually over a period of about 0.5 hour. Hydrogen sulfide was liberated during the reaction. Following completion of the reaction, the reaction mixture was filtered hot to remove any excess $P_2S_5$ and then the liquid was distilled under water pump vacuum to a maximum pot temperature of 100° C. to remove the benzene solvent. The product was recovered as an oil of medium viscosity and had an index of refraction $n^D_{20}$ of 1.5200. Analysis showed the product to have a sulfur content of 6.8% which corresponds to the theoretical sulfur content of 6.39%.

EXAMPLE III

Di-(oxyethylenated octylphenol)-dithiophosphate containing an average of seven to eight oxyethylene groups was prepared by charging 223.2 g. (0.4 mole) of oxyethylenated octylphenol containing an average of seven to eight oxyethylene groups per each octylphenyl group and 200 g. of benzene into a reaction flask. The mixture was stirred and heated to 80° C. and then 24.20 g. (0.1 mole + 5% excess) of $P_2S_5$ was added gradually to the stirred and heated mixture. Heating at 80° C. was continued for an additional one hour, after which the reaction mixture was filtered and the benzene removed by distillation under water pump vacuum to a maximum temperature of 100° C. The di-(oxyethylenated octylphenol)-dithiophosphate was recovered as an oil of medium viscosity having a refractive index $n^D_{20}$ of 1.5078. Analysis showed a phosphorus content of 2.48% which corresponds to the theoretical phosphorus content of 2.03%.

EXAMPLE IV

The compound of this example is di-(oxyethylenated octylphenol)-dithiophosphate having an average of nine to ten oxyethylene groups per each octylphenyl group and was prepared by charging 206.72 g. (0.32 mole) of di-(oxyethylenated octylphenol) - dithiophosphate having nine to ten oxyethylene groups and 200 g. of benzene into a reaction flask which was stirred and heated to 80° C. While stirring and heating, 19.53 g. (0.08 mole + 5% excess) of $P_2S_5$ was added gradually to the mixture. Stirring and heating were continued for an additional one hour, after which the solution was filtered and the benzene was removed by vacuum distillation. The di-(oxyethylenated octylphenol)-dithiophosphate was recovered as a fluid oil having a refractive index $n^D_{20}$ of 1.5055. Sulfur analysis showed 4.29% by weight of sulfur which corresponds to the theoretical sulfur content of 4.62%.

EXAMPLE V

The compound of this example is di-(oxyethylenated octylphenol)-dithiophosphate having an average of twelve to thirteen oxyethylene groups per each octylphenol group and was prepared by charging 233 g. (0.3 mole) of oxyethylenated octylphenol having an average of twelve to thirteen oxyethylene groups and 200 g. of benzene into a reaction flask which was stirred and heated to 80° C. While stirring and heating, 18.31 g. (0.075 mole + 5% excess) of $P_2S_5$ were added gradually to the mixture. Stirring and heating were continued for an additional one hour, after which the solution was filtered and the benzene was removed by vacuum distillation. The di-(oxyethylenated octylphenol)-dithiophosphate was recovered as a clear oil of medium viscosity and had an index of refraction $n^D_{20}$ of 1.5009. Analysis showed the product to have sulfur content of 3.61% which corresponds to the theoretical sulfur content of 3.88%.

EXAMPLE VI

Di-(oxyethylenated nonylphenol)-dithiophosphate containing five oxyethylene groups per each nonylphenyl group was prepared by charging 220 g. (0.5 mole) of oxyethylenated nonylphenol containing five oxyethylene groups per each nonylphenyl group and 200 g. of benzene into a reaction flask. The mixture was stirred and heated to 80° C. and then 29.14 g. (0.125 mole + 5% excess) of $P_2S_5$ were added gradually over a period of 0.5 hour. Stirring and heating at 80° C. was continued for an additional one hour, after which the reaction mixture was filtered and the benzene was removed by distillation under vacuum at a maximum temperature of 101° C. The di-(oxyethylenated nonylphenol)-dithiophosphate was recovered as a liquid of medium viscosity having a refractive index $n^D_{20}$ of 1.5167. Analyses showed a phosphorus content of 3.10% which corresponds to the theoretical phosphorus content of 3.08% and a sulfur content of 6.06% which corresponds to the theoretical sulfur content of 6.58%.

EXAMPLE VII

The compound of this example is di-(oxyethylenated nonylphenol)-dithiophasphate having an average of nine to ten oxyethylene groups per each nonylphenyl group and was prepared by charging 211.2 g. (0.32) mole of oxythylenated nonylphenol having an average of nine to ten oxyethylene groups and 200 g. of benzene into a reaction flask which was stirred and heated to 80° C. While stirring and heating, 19.53 g. (0.08 mole + 5% excess) of $P_2S_5$ were added gradually to the mixture. Stirring and heating were continued for an additional one hour, after which the solution was filtered and the benzene was removed by vacuum distillation. The di-(oxyethylenated nonylphenol)-dithiophosphate was recovered as an amber oil of medium viscosity and had an index of refraction $n^D_{20}$ of 1.5095. Sulfur analysis showed 2.57% which corresponds to the theoretical sulfur content of 2.22%.

EXAMPLE VIII

Di - (oxyethylenated nonylphenol) - dithiophosphate containing an average of twelve to thirteen oxyethylene groups per each nonylphenyl group was prepared by charging 237 g. (0.3 mole) of oxyethylenated nonylphenol containing an average of twelve to thirteen oxyethylene groups and 200 g. of benzene into a reaction flask. The mixture was stirred and heated to 80° C. and then 19.53 g. (0.08 mole + 5% excess) of $P_2S_5$ were added gradually over a period of 0.5 hour. Stirring and heating at 80° C. was continued for an additional one hour, after which the reaction mixture was filtered and the benene was removed by distillation under vacuum at a maximum temperature of 102° C. The di-(oxyethylenated nonylphenol)-dithiophosphate was recovered as a transparent liquid of medium viscosity having an index of refraction $n^{D}_{20}$ of 1.4995.

EXAMPLE IX

The zinc salt of di-(oxyethylenated nonylphenol)-dithiophosphate having an average of twelve to thirteen oxyethylene groups per each nonylphenyl group, prepared as described in Example VIII, was prepared by charging 122.2 g. (0.08 mole of equivalent weight) of this oxyethylenated nonylphenol into a reaction flask, stirring, blanketing with nitrogen and heating gradually. While stirring and heating the contents of the flask, 3.256 g. (0.04 mole) of zinc oxide were added gradually over a period of ten minutes. The mixture was stirred and heated to a maximum temperature of 122° C. Subsequently, benzene was added and the reaction mass was filtered. The benzene was removed by vacuum distillation at a maximum temperature of 125° C. The zinc salt of di-(oxyethylenated nonylphenol)-dithiophosphate was recovered as an amber liquid of medium viscosity. Analysis showed a zinc content of 1.5% by weight which corresponds to the theoretical zinc content of 1.89%.

EXAMPLE X

This example describes the preparation of the zinc salt of di-(oxyethylenated octylphenol)-dithiophosphate having an average of nine to ten oxyethylene groups per each octylphenyl group. The di-(oxyethylenated octylphenol)-dithiophosphate, prepared as described in Example IV, and 105.2 g. (0.08 mole of equivalent weight) of this compound were charged to a reaction flask, stirred, nitrogen added and the mixture heated gradually. While stirring and heating, 3.256 g. (0.04 mole) of zinc oxide were added gradually and the stirring and heating continued to a maximum temperature of 147° C. Following completion of the reaction, benzene was added and the reaction mass was filtered. The benzene was removed by vacuum distillation at a maximum temperature of 125° C. The zinc salt of di-(oxyethylenated octylphenol)-dithiophosphate was recovered as an amber heavy oil.

EXAMPLE XI

The compound of this example is the zinc salt of di-(oxyethylenated nonylphenol)-dithiophosphate containing one oxyethylene group per each nonylphenyl group. This salt was prepared from di-(oxyethylenated nonylphenol)-dithiophosphate which, in turn, was prepared as follows. Nonylphenol was charged into a reaction bomb which then was surged with nitrogen and stirred and heated to 150° C. An equal mole proportion of ethylene oxide was pressured into the reaction bomb, while stirring and heating the mixture. Oxyethylenated nonylphenol containing one oxyethylene group was recovered as a water white liquid. Two mole proportions of the oxyethylenated nonylphenol were charged into a reaction flask and 200 cc. of benzene were added thereto. The mixture was heated to 60° C. and 0.5 mole of $P_2S_5$ was added gradually over a period of 2.5 hours, during which time the temperature rose to 72° C. The mixture then was heated to 90° C. for two hours. After completion of the reaction, the reaction mass was filtered and then vacuum distilled to remove benzene solvent. The di-(oxyethylenated nonylphenol)-dithiophosphate was recovered as an amber liquid. Analyses showed a sulfur content of 9.28% which corresponds to the theoretical sulfur content of 10.3% and a phosphorus content of 4.12% which corresponds to the theoretical phosphorus content of 5.0%.

The di-(oxyethylenated nonylphenol)-dithiophosphate, prepared in the above manner, was used in the preparation of the zinc salt in the following manner. 92.48 g. (0.16 mole of equivalent weight) of the di-(oxyethylenated nonylphenol)-dithiophosphate were commingled with 25 ml. of methanol and the mixture was heated to 65° C., following which 10.4 g. (0.16 mole) of potassium hydroxide dissolved in 25 ml. of methanol were added while the mixture was being stirred and heated. This followed by the gradual addition of 10.9 g. (0.08 mole) of zinc chloride dissolved in 100 ml. of hot methanol. The mixture was stirred and heated for an additional 1.5 hours. Following completion of the reaction, ethyl ether and benzene were added and the mixture was filtered to remove potassium chloride formed during the reaction. This was followed by vacuum distillation at a maximum temperature of 123° C. to remove the solvents. The zinc salt of di-(oxyethylenated nonylphenol)-dithiophosphate was recovered as a gray oil of medium viscosity. Analysis showed a zinc content of 4.05% which corresponds to the theoretical zinc content of 4.98%.

EXAMPLE XII

The compound of this example is di-(oxypropylenated decylphenol)-dithiophosphate containing three oxypropylene groups per each decylphenyl group. This compound is prepared by charging one mole proportion of oxypropylenated decylphenol containing three oxypropylene groups and benzene solvent into a reaction vessel which is stirred and heated to 80° C. At this temperature and with stirring, 0.25 mole proportion plus 10% excess of $P_2S_5$ is added gradually and the stirring and heating is continued for an additional 1.5 hours. Following completion of the reaction, the reaction mixture is filtered and the benzene is removed by vacuum distillation. The di-(oxypropylenated decylphenol)-dithiophosphate is recovered as a liquid of medium vicosity.

EXAMPLE XIII

The compound of this example is di-(oxyethylenated dodecanol)-dithiophosphate having an average of five oxyethylene groups per each dodecyl group. This compound is prepared by charging four mole proportions of oxyethylenated dodecanol containing five oxyethylene groups and xylene solvent into a reaction zone and then stirring and heating the mixture to 140° C. At this temperature and with stirring, one mole proportion plus 5% excess of $P_2S_5$ is added gradually accompanied by vigorous stirring and heating at 140° C. Heating is continued for an additional two hours. Following completion of the reaction, excess $P_2S_5$ is removed by filtration. The xylene solvent is removed by vacuum distillation. The di-(oxyethylenated dodecanol)-dithiophosphate is recovered as a liquid of medium viscosity.

EXAMPLE XIV

As hereinbefore set forth, the compounds of the present invention are of utility as additives in lubricating oils. One method of evaluating lubricating oils is by the Falex machine. This procedure is described in detail in a book entitled "Lubricant Testing" authored by E. G. Ellis and published by Scientific Publications (Great Britain) Limited, 1953, pages 150–154. Briefly, the Falex machine consists of a rotating pin which runs between two V shape bearings which are spring loaded against the pin and provided with means for varying the load. The oil to be tested is poured into a metal trough in which the pin and bearings are partly submerged. The machine was operated for five minutes each at 250 and 500 pound loads and then forty-five minutes at 750 pounds load. The data collected includes the temperature of the oil at each of the loads and the torque in pounds per square inch at each load, as well as the wear which is determined by a ratchet wheel arrangement in which the teeth are advanced in order to maintain the desired load. Each tooth is equivalent to approximately 0.000022 inch. Preferred additives are those which impart low temperature, low torque and low wear to the oil.

In another series of tests the machine was operated for five minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

The lubricating oil used in this example is dioctyl sebacate synthetic lubricating oil marketed under the trade name of "Plexol 201."

Run No. 1 in the following table is a run made using the "Plexol" not containing an additive and thus is the blank or control run.

Run No. 2 is a run made using another sample of "Plexol" to which had been added two percent by weight of di-(oxyethylenated octylphenol)-dithiophosphate containing three oxyethylene groups prepared as described in Example I.

Run No. 3 is a run made using another sample of "Plexol" to which had been added two percent by weight of di-(oxyethylenated octylphenol)-dithiophosphate containing an average of seven to eight oxyethylene groups prepared as described in Example III.

Run No. 4 is a run made using another sample of the "Plexol" to which had been added two percent by weight of di-(oxyethylenated octylphenol)-dithiophosphate having an average of nine to ten oxyethylene groups prepared as described in Example IV.

Run No. 5 is a run made using another sample of the "Plexol" to which had been added two percent by weight of di-(oxyethylenated octylphenol)-dithiophosphate having an average of twelve to thirteen oxyethylene groups prepared as described in Example V.

Run No. 6 is a run made using another sample of the "Plexol" to which had been added two percent by weight of di-(oxyethylenated nonylphenol)-dithiophosphate containing four oxyethylene groups per each nonylphenyl group. This compound was prepared in substantially the same manner as heretofore described.

Run No. 7 is a run made using another sample of the "Plexol" to which had been added two percent by weight of di-(oxyethylenated nonylphenol)-dithiophosphate containing five oxyethylene groups prepared as described in Example VI.

Run No. 8 is a run made using another sample of the "Plexol" to which had been added two percent by weight of di-(oxyethylenated nonylphenol)-dithiophosphate having an average of nine to ten oxyethylene groups prepared as described in Example VII.

Run No. 9 is a run made using another sample of the "Plexol" to which has been added two percent by weight of di-(oxyethylenated nonylphenol)-dithiophosphate having an average of twelve to thirteen oxyethylene groups prepared in substantially the same manner as described in Example VIII.

From the data in the above table, it will be seen that the dioctyl sebacate without additive (Run No. 1) underwent seizure at a load of 750 pounds. In contrast, seizure conditions for the samples of the dioctyl sebacate containing the compounds of the present invention were from 1250 to 1750 pounds.

EXAMPLE XV

Another series of evaluations were made in the same manner as described in Example XIV, except that the lubricating oil was a mineral oil marketed as "Carnes 340 White Oil." Typical specifications of this oil include the following:

| | |
|---|---|
| Distillation range, ° F. | 740–975 |
| Specific gravity at 60° F. | 0.8836 |
| Viscosity: | |
| At 100° F. | 360 |
| At 210° F. | 52.2 |
| Flash point, COC, ° F. | 440 |
| Pour point, ° F. | −20 |
| Refractive index at 68° F. | 1.4805 |
| Saybolt color | +30 |

Some of the additives were not readily soluble in the white oil and, accordingly, were solubilized by commingling nonylphenol therewith and heating and stirring as required.

Run No. 10 in the following table is a run made using the white oil not containing an additive and thus is the blank or control run.

Run No. 11 is a run made using another sample of the white oil to which had been added two percent by weight of di-(oxyethylenated octylphenol)-dithiophosphate containing three oxyethylene groups prepared as described in Example I.

Run No. 12 is a run made using another sample of the while oil to which had been added two percent by weight of di-(oxyethylenated octylphenol)-dithiophosphate containing an average of seven to eight oxyethylene groups prepared as described in Example III.

Run No. 13 is a run made using another sample of the white oil to which had been added two percent by weight of di-(oxyethylenated octylphenol)-dithiophosphate having an average of nine to ten oxyethylene groups prepared as described in Example IV.

Run No. 14 is a run made using another sample of the white oil to which had been added two percent by weight of di-(oxyethylenated octylphenol)-dithiophosphate having an average of twelve to thirteen oxyethylene groups prepared as described in Example V.

Run No. 15 is a run made using another sample of the white oil to which had been added two percent by weight

TABLE I

| Run No. | Temperature, ° F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, ° F. |
| 1 | 150 | 231 | 490-S | 3-4 | 9-10 | 18-S | 0 | 0 | S | 750 | 2 | 490 |
| 2 | 190 | 275 | 399 | 3-6 | 9-14 | 13-27 | 0 | 0 | 12 | 1,500 | 1.0 | 500 |
| 3 | 180 | 265 | 360 | 3-6 | 9-13 | 13-18 | 0 | 0 | 9 | 1,500 | 0.5 | 463 |
| 4 | 170 | 252 | 353 | 3-6 | 8-13 | 13-18 | 0 | 0 | 10 | 1,500 | 4.7 | 488 |
| 5 | 166 | 238 | 363 | 3-6 | 8-14 | 14-20 | 0 | 0 | 15 | 1,250 | 3.8 | 488 |
| 6 | 169 | 253 | 390 | 3-5 | 9-14 | 14-20 | 0 | 0 | 10 | 1,500 | 0.5 | 475 |
| 7 | 182 | 262 | 380 | 3-6 | 8-13 | 12-18 | 0 | 0 | 17 | 1,500 | 0.1 | 463 |
| 8 | 154 | 245 | 396 | 3-5 | 9-15 | 12-24 | 0 | 0 | 29 | 1,250 | 2.5 | 488 |
| 9 | 160 | 250 | 343 | 3-5 | 8-13 | 11-16 | 0 | 0 | 12 | 1,750 | 0.1 | 538 |

S = Seizure.

of di-(oxyethylenated nonylphenol)-dithiophosphate containing four oxyethylene groups per each nonylphenyl group. This compound was prepared in substantially the same manner as heretofore described.

Run No. 16 is a run made using another sample of the white oil to which had been added two percent by weight of di-(oxyethylenated nonylphenol)-dithiophosphate having an average of twelve to thirteen oxyethylene groups prepared in substantially the same manner as described in Example VIII.

TABLE II

| Run No. | Temperature, °F. | | | Torque, lbs. | | | Wear, Teeth | | | Seizure Conditions | | |
|---|---|---|---|---|---|---|---|---|---|---|---|---|
| | 250 | 500 | 750 | 250 | 500 | 750 | 250 | 500 | 750 | Load | Time | Temperature, °F. |
| 10 | 172 | 350-S | | 5-6 | 30-S | | 0 | S | | 425 | <0.1 | 275 |
| 11 | 188 | 295 | 475-S | 3-5 | 9-14 | 19-S | 0 | 0 | 2-S | 750 | 4.2 | 475 |
| 12 | 197 | 287 | 450-S | 3-6 | 8-14 | 17-S | 0 | 0 | 0-S | 750 | 3.2 | 450 |
| 13 | 176 | 278 | 363 | 4-7 | 10-14 | 13-22 | 0 | 0 | 16 | 1,000 | 4.5 | 438 |
| 14 | 178 | 274 | 390 | 3-6 | 8-13 | 14-21 | 0 | 0 | 12 | 1,250 | 1.0 | 438 |
| 15 | 170 | 280 | 395 | 3-5 | 8-13 | 12-19 | 0 | 0 | 18 | 1,250 | 0.75 | 463 |
| 16 | 182 | 328 | 424 | 3-5 | 12-17 | 15-22 | 0 | 0 | 11 | 1,000 | 1.7 | 450 |

S=Seizure.

Here again, it will be seen that the oil without additive (Run No. 10) underwent seizure at a small load which, in this case, was 425 pounds. In contrast, the white oil containing the additive of the present invention did not undergo seizure until loads of from 750 to 1250 pounds.

EXAMPLE XVI

The zinc salt of di-(oxyethylenated nonylphenol)-dithiophosphate, prepared as described in Example XI, also was evaluated in the Falex machine described in Example XIV. However, the synthetic lubricating oil used in this example is pentaerythritol ester marketed commercially as "Hercules J64."

When evaluated in this manner, the "Hercules J64" oil without additive had a seizure load of 1000 pounds. A sample of the same oil containing two percent by weight of the zinc salt of di-oxyethylenated nonylphenol)-dithiophosphate, prepared as described in Example XI, had a seizure load of 1250 pounds.

EXAMPLE XVII

The compound of Example I is used in a concentration of 0.5% by weight as an additive in grease. The additive is incorporated in a commercial Mid-Continent lubricating oil having an S.A.E. viscosity of 20. Approximately 92% of the lubricating oil then is mixed with approximately 8% by weight of lithium stearate. The mixture is heated to about 232° C., with constant agitation. Subsequently, the grease is cooled, while agitating, to approximately 120° C., and then the grease is further cooled slowly to room temperature.

The stability of the grease is tested in accordance with ASTM D-942 method, in which method a sample of the grease is placed in a bomb and maintained at a temperature of 120° C. Oxygen is charged to the bomb, and the time required for a drop of five pounds pressure is taken as the Induction Period. A sample of the grease without additive will reach the Induction Period in about eight hours. On the other hand, a sample of the grease containing 0.3% by weight of the additive of the present invention will not reach the Induction Period for more than 100 hours.

I claim as my invention:

1. Oxyalkylenated hydroxyhydrocarbon thiophosphate containing one or two oxyalkylenated hydroxyhydrocarbon radicals per molecule in which the hydroxyhydrocarbon moiety is selected from the group consisting of:
   (a) an alkylphenol having from 1 to 3 nuclearly attached alkyl groups, one of which contains from 4 to 30 carbon atoms and, when there is more than one alkyl group, such other alkyl group or groups contain from 1 to 30 carbon atoms each, and
   (b) an aliphatic alcohol containing from 6 to 40 carbon atoms, and in which the oxyalkylene group contains 1 to 10 carbon atoms, the oxyalkylenated hydroxyhydrocarbon radical containing from one to forty oxyalkylene groups.

2. Oxyalkylenated hydroxyhydrocarbon dithiophosphate containing one or two oxyalkylenated hydroxyhydrocarbon radicals per molecule in which the hydroxyhydrocarbon moiety is selected from the group consisting of:
   (a) an alkylphenol having from 1 to 3 nuclearly attached alkyl groups, one of which contains from 4 to 30 carbon atoms and, when there is more than one alkyl group, such other alkyl group or groups contain from 1 to 30 carbon atoms each, and
   (b) an aliphatic alcohol containing from 6 to 40 carbon atoms, and in which the oxyalkylene group contains 1 to 10 carbon atoms, the oxyalkylenated hydroxyhydrocarbon radical containing from one to forty oxyalkylene groups.

3. Oxyalkylenated alkylphenol dithiophosphate containing one or two oxyalkylenated alkylphenol radicals per molecule in which the alkylphenol has from 1 to 3 nuclearly attached alkyl groups, one of which contains from 4 to 30 carbon atoms and, when there is more than one alkyl group, such other alkyl group or groups contain from 1 to 30 carbon atoms each; and in which the oxyalkylene group contains from 1 to 10 carbon atoms, the oxyalkylenated alkylphenol radical containing from 1 to 40 oxyalkylene groups.

4. The compound of claim 3 containing two oxyalkylenated alkylphenol radicals per molecule.

5. Oxyethylenated alkanol dithiophosphate containing one or two oxyethylenated alkanol radicals per molecule in which the alkanol contains from 6 to 40 carbon atoms, the oxyethylenated alkanol radical containing from 1 to 40 oxyethylene groups.

6. The compound of claim 5 containing two oxyethylenated alkanol radicals per molecule.

7. Oxyalkylenated alkanol thiophosphate containing one or two oxyalkylenated alkanol radicals per molecule in which the alkanol contains from 6 to 40 carbon atoms and in which the oxyalkylene group contains from 1 to 10 carbon atoms, the oxyalkylenated alkanol radical containing from 1 to 40 oxyalkylene groups.

8. Di-(oxyethylenated alkylphenol)-dithiophosphate in which the alkylphenol has from 1 to 3 nuclearly attached alkyl groups, one of which contains from 4 to 30 carbon atoms and, when there is more than one alkyl group, such other alkyl group or groups contain from 1 to 30 carbon atoms each, the oxyethylenated alkylphenol radicals each containing from 1 to 40 oxyethylene groups.

9. The compound of claim 8 wherein the alkylphenol is octylphenol.

10. The compound of claim 8 wherein the alkylphenol is nonylphenol.

References Cited

UNITED STATES PATENTS 3,056,744  10/1962  Copes et al. _____ 252—8.8

CHARLES B. PARKER, *Primary Examiner.*

BERNARD BILLIAN, *Assistant Examiner.*